United States Patent

Mehoudar

[11] 4,060,200
[45] Nov. 29, 1977

[54] DRIP LEVEL IRRIGATION

[75] Inventor: Raphael Mehoudar, Tel-Aviv, Israel

[73] Assignee: Hydro-Plan Engineering Ltd., Tel-Aviv, Israel

[21] Appl. No.: 604,838

[22] Filed: Aug. 14, 1975

[30] Foreign Application Priority Data

Aug. 14, 1974 Israel .................................. 45466

[51] Int. Cl.² .............................................. B05B 15/00
[52] U.S. Cl. .................................. 239/542; 138/42
[58] Field of Search ............... 239/267, 542, 547, 600; 138/42, 43

[56] References Cited

U.S. PATENT DOCUMENTS

| | | | |
|---|---|---|---|
| 3,323,550 | 6/1967 | Lee | 138/43 X |
| 3,667,685 | 6/1972 | Rinkewich | 239/542 |
| 3,753,527 | 8/1973 | Galbraith et al. | 239/547 X |
| 3,870,236 | 3/1975 | Sahagun-Barragan | 239/542 |
| 3,882,892 | 5/1975 | Menzel | 239/542 X |

FOREIGN PATENT DOCUMENTS 1,523,331  3/1968  France ................... 239/542

*Primary Examiner*—Evon C. Blunk
*Assistant Examiner*—Andres Kashnikow
*Attorney, Agent, or Firm*—Donald M. Sandler

[57] ABSTRACT

An emitter unit comprises a pair of casing components and a coupling for coupling said components together via an interposed strip that extends beyond the components on all sides and is adapted to form a closed conduit such that one component is inside the conduit and one is outside. At least one of the components defines, together with the interposed strip, a flow restricting flowpath. Apertures are provided for effecting communication between said flowpath and the other component via said strip.

8 Claims, 15 Drawing Figures

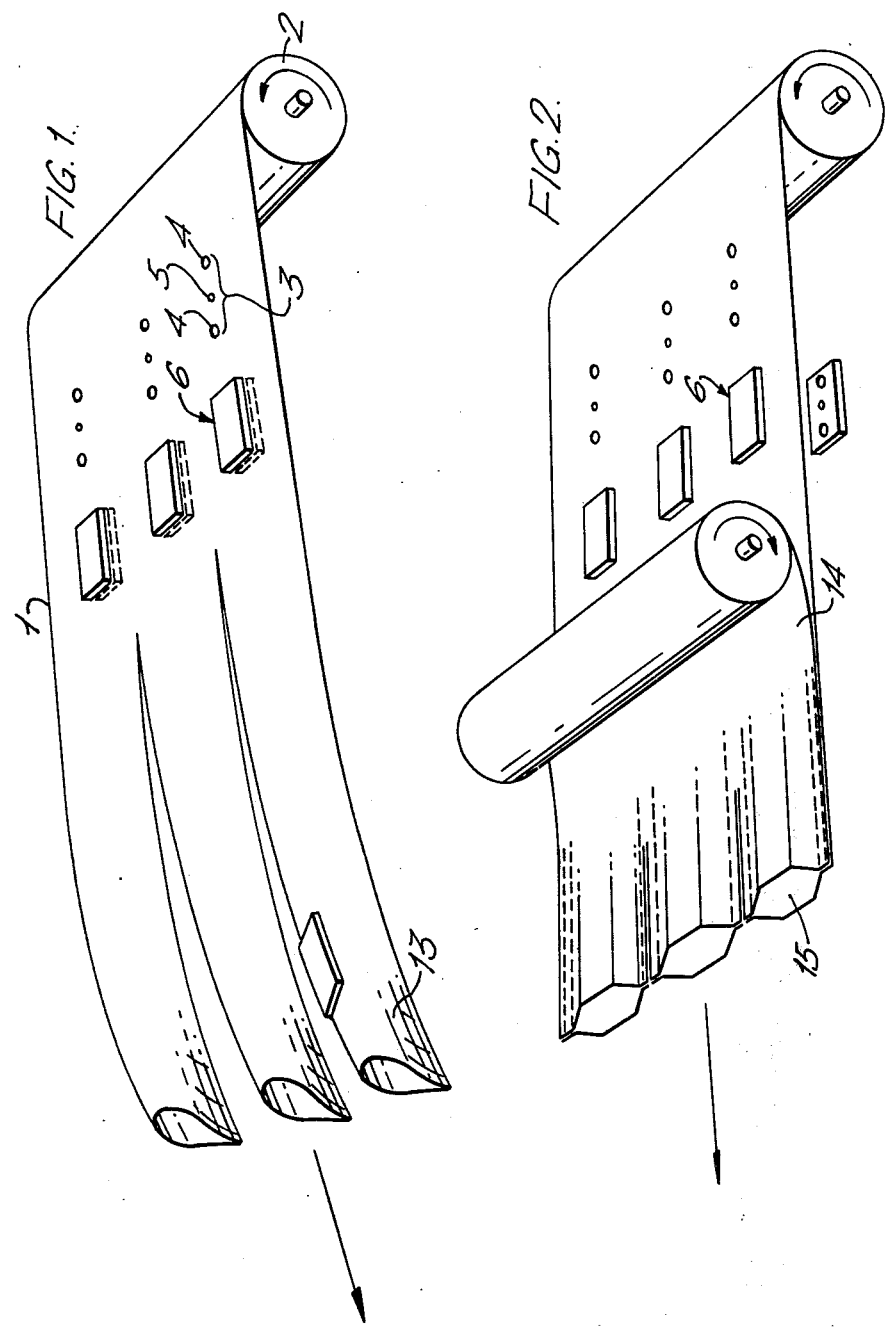

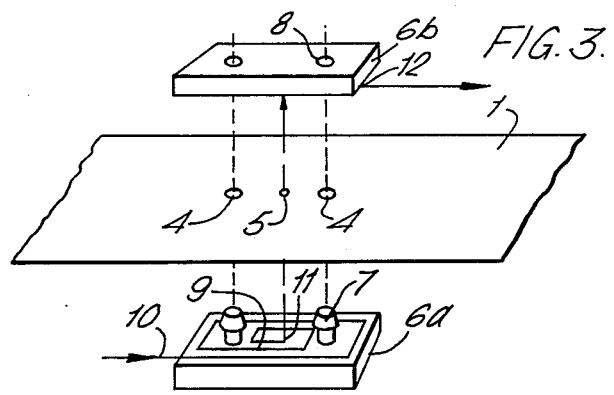
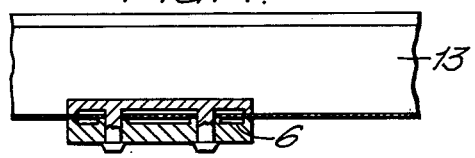
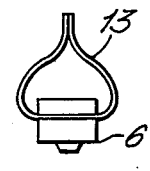
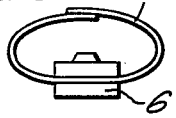
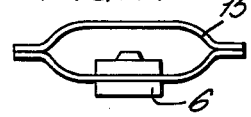
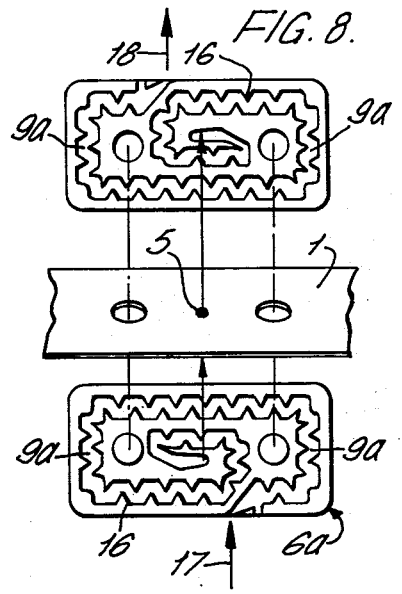
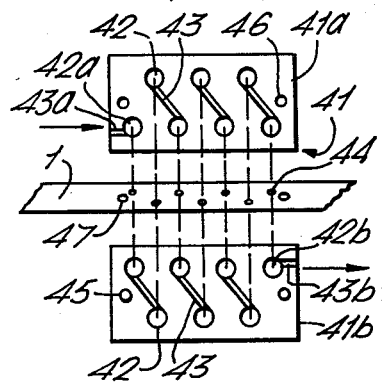

U.S. Patent   Nov. 29, 1977   Sheet 3 of 3   4,060,200
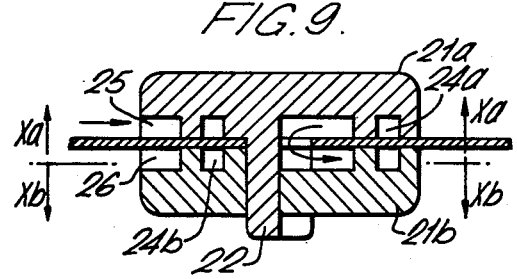
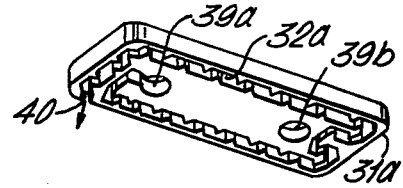
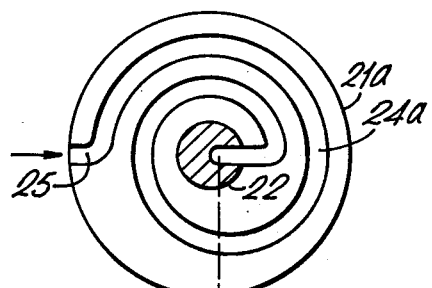
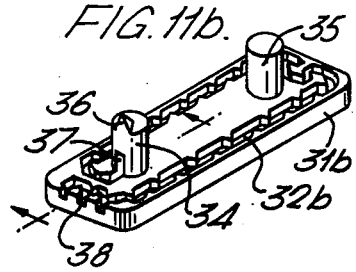
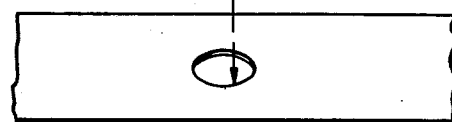
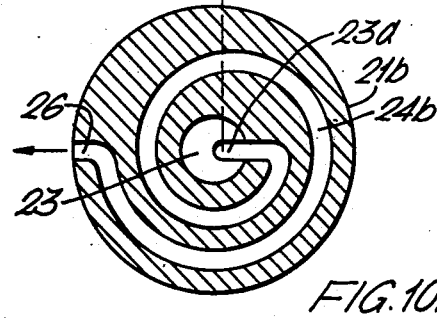
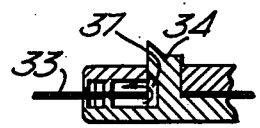

DRIP LEVEL IRRIGATION

This invention relates to drip level irrigation and is particularly concerned with drip level irrigation conduits adapted to be coupled to irrigation installations so as to ensure a drip-like output at the required locations.

Drip level irrigation is being more and more employed throughout the world, it having been accepted that this form of irrigation is not only desirable from the point of view of water economy but is also beneficial to the plants being irrigated.

The most commonly employed type of drip level installation is that wherein drip level emitter units are mechanically coupled to semi-rigid irrigation pipes (generally formed of semi-rigid plastics material), a portion of the irrigation water flowing through the pipe at supply pressure being diverted into the emitter unit so as to emerge therefrom as a substantially pressureless drip. Various modes of coupling such emitter units to the irrigation pipes are disclosed, as for example, in U.S. Pat. Nos. 3,420,064; 3,604,728 and 3,815,636.

Such installations, when installed are designed to be operative over a number of years during which time periodic servicing may be necessary so as to replace or repair blocked or otherwise defective emitter units and defective portions of conduit. In order to ensure the durability of the installation the conduit material must be of a sufficiently high quality and this, of course, substantially increases its cost.

It is for this reason that is has already been proposed to provide drip level irrigation installations using conduits which are relatively thin walled and can therefore be mass produced at relatively low cost. Such installations are generally designed for one-season use after which they can be replaced by new installations. Such installations and their associated conduits will be referred to as disposable installations and conduits.

In order to ensure a drip-like discharge from these disposable installations it has been proposed to produce the disposable conduit with an integrally formed narrow diameter flow restricting tube through which a portion of the water flowing through the conduit is diverted so as to emerge at a substantially reduced pressure. Such means for ensuring the production of a drip-like discharge from such disposable installations has proven to be of limited value in practice, it being difficult to ensure a controlled pressureless rate of discharge which is not seriously affected by topographical variations. Furthermore, the extrusion of such double conduits is expensive in practice and the outlet apertures being very small are subject to blocking.

On the other hand, in view of the flimsy nature of the disposable conduit it has been found to be extremely difficult to couple thereto any of the known forms of emitter units with which a controlled pressureless discharge rate can be obtained.

It is an object of the present invention to provide for a new and improved emitter unit which can be readily coupled to a relatively flimsy conduit.

It is a further object of the present invention to provide for a process for the production of a drip level irrigation conduit in which the above referred to disadvantages are substantially avoided or overcome.

According to one aspect of the present invention there is provided an emitter drip unit comprising a pair of casing components, coupling means for coupling said components together via an interposed strip, wall portions of at least one component defining together with said interposed strip a flow restricting flowpath, communicating means for effecting communication between said flowpath and the other component via said strip.

According to another aspect of the present invention there is provided a process for the production of a drip level irrigation conduit comprising the steps of:
 a. dispensing an elongated, substantially rectangular flexible strip,
 b. coupling constitutent components of successive emitter drip units to each other via said interposed strip at spaced apart intervals flow communication being effected through the strip, and
 c. bonding the longitudinal edges of the strip so as to form a conduit.

The components can be suitably press fastened to each other through the strips.

In this way the portion of the strip which separates the two components can itself constitute a wall which serves to define, with the elongated groove formed in the unit, a flow restricting flowpath.

With this two component unit the interposed strip, which serves as a dividing wall, can be instrumental in effectively doubling the flowpath. Thus the water diverted into one of the components through an appropriate inlet flows through the flowpath formed in that component and emerges at the end of that flowpath and flows through an appropriate aperture formed in the strip into the opposite component and through the flowpath formed therein so as to emerge therefrom as a pressureless drip.

The longitudinal edges of the strip can be bonded to each other so as to form the conduit or, alternatively, an additional like strip can be provided, the longitudinal edges of which are respectively bonded to the longitudinal edges of the first strip.

It will be readily seen that the process in accordance with the present invention lends itself particularly for the production of conduits formed of thin walled materials which could not otherwise readily be coupled to relatively rigid emitter units, seeing that in accordance with the present invention coupling between the unit and the strip forming the conduit takes place over a relatively enlarged area.

The invention also envisages the provision of various emitter units suitable for use with the process in accordance with the present invention.

Various embodiments in accordance with the present invention will now be described by way of example and with reference to the accompanying drawings in which:

FIG. 1 shows schematically the various stages in a process for the production of a drip level irrigation conduit in accordance with the present invention;

FIG. 2 shows schematically details of a modified process in accordance with the present invention;

FIG. 3 shows in perspective exploded view a two-component emitter unit and an interposed apertured strip;

FIG. 4 is a longitudinally sectioned view showing the coupling of an emitter unit as shown in FIG. 3 in an assembled conduit;

FIG. 5 is a longitudinal end view of the conduit and emitter unit shown in FIG. 4;

FIGS. 6 and 7 are longitudinal end views of modified forms of conduits and emitter units in accordance with the invention;

FIG. 8 shows in plan view corresponding grooved faces of the components of an emitter unit in accordance with the invention with an interposed apertured strip;

FIG. 9 is a longitudinally sectioned representation of an alternate form of dripper and interposed strip;

FIGS. 10a and 10b are cross-sectional views of the unit shown in FIG. 9 taken respectively along the lines Xa — Xa and Xb — Xb with the interposed strip shown therebetween;

FIGS. 11a and 11b are respective perspective elevations of the constituent components of a still further form of dripper in accordance with the present invention;

FIG. 12 is a longitudinally sectioned view of a portion of an assembled unit formed of the components shown in FIGS. 11a and 11b; and FIG. 13 is a schematic representation of a still further alternative form of emitter unit and interposed strip in accordance with the present invention.

As seen in FIG. 1 of the drawings an elongated plastic strip 1 is dispensed from a roll 2 and is apertured with sets of apertures 3 which are transversely spaced apart, each set comprising two outer apertures 4 and one inner aperture 5. Sets of two-component emitter units 6 as shown clearly in FIG. 3 of the drawings are pressed into position. A first component 6a is formed with pins 7 and these extend through the two outer apertures 4 formed in the strip into appropriate apertures 8 formed in a second component 6b. A flowpath 9 defined in the first component 6a communicates at one end with an inlet 10 and at the other end with an outlet 11 which communicates via the central aperture 5 formed in the strip 1 with a suitable inlet in the second component which communicates with a flowpath (not shown in FIG. 3) having an outlet 12.

As can be readily seen from FIG. 3 of the drawings when the two components 6a and 6b of the unit 6 are brought together they become press fastened having the strip 1 interposed, said strip 1 forming a dividing wall which contributes to defining the flowpath in both components.

Reverting to FIG. 1, with the emitter units 6 mechanically and flow coupled to the strip 1 the latter is longitudinally slit between adjacent units 6 so as to form three component strips which are then bent round so that their adjacent edges abut and are heat welded or otherwise bonded together.

In this way there is obtained a continuous conduit 13 to which is coupled at spaced apart locations emitter units 6 such that water flowing through the conduit has successive portions thereof diverted into the unit components 6a located within the conduit 13 follow the flowpaths 9 therein and emerge therefrom passing through the strip 1 and enter the unit components 6b located outside the conduit following the flowpath therein and emerging therefrom as a pressureless drip.

FIGS. 4 and 5 show respective views of the formed conduit and coupled emitter unit as described above. FIG. 6 shows an alternative mode of bonding together overlapping edges of the strip so as to form the conduit 13'.

As seen in FIG. 2 of the drawings, in an alternative modification of the process there is dispensed simultaneously with the strip 1 which is apertured and to which is coupled the emitter units 6 a superimposed strip 14 which covers the innermost unit components the two superimposed strips 14 and 1 being then slit and their adjacent edges bonded together so as to form conduits 15 of a kind shown in end-on view in FIG. 7 of the drawings.

FIG. 8 illustrates a particular form of flowpath 9 formed in a two-component emitter unit 6 of the kind shown in FIGS. 3 and 4 of the drawings. As seen in the drawing this flowpath 9 is of a meandering type having several rectilinear flowpath sections 9a formed with baffle teeth 16 of a kind and dispostion as disclosed and described in our co-pending patent application Ser. No. 605,840, wherein there are described units each comprising at least two sets of oppositely directed baffle teeth projecting into said flowpath, the baffle teeth of one set being respectively directed towards the inter-baffle teeth regions of the opposite set, the baffle teeth terminating in baffle tips, the tip of each baffle tooth being substantially aligned with the tips of the opposite pair of adjacent baffle teeth, each baffle tooth tip being of a width $\xi$ wherein $0 < \xi < 0.25\Delta$ where $\Delta$ is the minimum throughflow spacing in the emitter unit.

As can be seen water enters the innermost unit component in the direction of the arrow 17, follows the meandering flowpath and emerges from a central terminal position thereof so as to pass through the central aperture 5 formed in the strip into the corresponding central terminal position of the flowpath formed in the outer component, follows the meandering flowpath in the outer component and emerges therefrom in the direction of the arrow 18. As can be readily seen the flowpath in both components are defined by the meandering groove formed therein and the common dividing wall constituted by the interposed strip 1.

In FIGS. 9 and 10 of the drawings there is shown an alternative form of two-component emitter unit 21 which is effectively constituted by a pair of button-like components 21a and 21b. The component 21a is formed integrally with a central, axially slotted pin 22 whilst the component 21b is formed with a central aperture 23 having an inwardly directed radial tongue 23a which fits within and seals the slot of the pin 22. The components 21a and 21b are respectively formed with elongated helical paths 24a, 24b. The path 24a communicates at one end with an inlet 25 and at the other end with the slot formed in the pin 22. The path 24b communicates at its inner end, via an aperture formed in the interposed strip, with the path 24a and, at its outer end, with an outlet 26. In this case the two components 21a and 21b of the emitter unit are press fitted together by means of the single pin 22 which passes through the single aperture formed in the strip, said single aperture also serving for flow coupling the two components 21a and 21b together.

In the embodiment shown in FIG. 13 of the drawings a two-component unit 41 is again shown, each component however being formed with a set of hollow cells 42 coupled together by suitable tangential channels 43, the cells 42 of one component 41a communicating with corresponding cells 42 of the other component 41b via respective apertures 44 formed in the strip 1. The innermost piece 41a is formed with an inlet cell 42a and inlet channel 43a whilst the outermost component 41b is formed with an outlet cell 42b and an outlet channel 43b. The two components 41a and 41b are coupled together by means of a pair of pins 45 and apertures 46 designed to pass through corresponding apertures 47 formed in the strips.

In use water enters the inlet 42a via the inlet tangential channel 43a, undergoes vortical flow therein and passes out of the inlet cell 42a through the aligned aperture 44 formed in the strip 1 and into the aligned cell 42 formed in the other piece 41b in which it undergoes expansion and passes through the tangential channel 43 into the adjacent cell 42 in that piece that it again undergoes vortical flow. Thus in passing from cell to cell the wall undergoes alternately expansion and vortical flow respectively until it finally emerges from the outlet cell 42b as a substantially pressureless drip.

In the embodiment shown in FIGS. 11 and 12 of the drawings a pair of components 31a and 31b have formed therein corresponding grooves 32a and 32b which define together with an interposed strip 33 (see FIG. 13) intercommunicating flowpaths. The component 31b is formed with a pair of coupling pins 34 and 35, the pin 34 being formed with a strip cutting projection 36. The groove 22 communicates at one end with an axial recess 37 formed in the pin 34 and its opposite end with a plurality of dripper inlets 38. Formed in the component 31a is a pair of apertures 39a and 39b, the groove 32a communicating at one end with the aperture 39a and, at its opposite end, with a dripper outlet 40.

The components are pressed into engagement via the interposed plastic strip 33, the pins 34 and 35 serving to aperture the strip. By virtue of the fact that the pin 34 is provided with a strip cutting projection 36, the possibility of a severed portion of the strip blocking the adjacent groove is avoided.

When the components are assembled with the strip 33 interposed, water entering via the inlets 38 passes along the flowpath formed by the groove 32b, emerges via the recess 37 into the flowpath formed by the groove 32a so as to emerge as a drip from the outlet 40.

Whilst in the embodiments illustrated and described each emitter comprises a pair of dissimilar components (one provided with coupling pins and one provided with coupling apertures), emitter units comprising identical components can be provided - this leading to economies in production. Thus each component can be formed with one pin and one aperture, the pin of one component fitting into the aperture of the other component. Alternatively, the emitter unit can comprise identical components with separate coupling means. For example, a pair of such components can be effectively stapled together via an interposed strip.

As a still further alternative, whilst one of the components of the emitter unit is formed with the pressure reducing flowpath as described above, the other component need not necessarily be so formed and under these circumstances will merely serve to ensure the coupling of the unit as a whole to the strip.

Furthermore, whilst in the specific embodiment described above the two-component emitter units are coupled to the strip and in consequence to the conduit as a result of press fastening, other forms of coupling can equally well be envisaged within the framework of the present invention. Thus, one or two-component units can be suitably bonded to the strip. In the case of the two-component unit the coupling elements of the two components (pins and apertures, etc.) may be ultrasonically welded together with the strip interposed.

A distinct advantage, however, resides in the arrangement where the emitter components are not secured together by being separately bonded to the interposed strip but are rather directly secured to each other by press fastening, bonding, welding, etc., with the strip merely interposed. Thus bonding or welding to a relatively flimsy interposed strip is difficult and may interfere or even block the flowpath defined with the strip. On the other hand, where the components are directly secured together no such difficulties arise.

I claim:
1. An emitter unit comprising a pair of casing components, each having a surface, and oriented so that the surfaces face each other, coupling means for coupling said components together via a unitary strip that has continuous opposite surfaces, the strip being interposed between the components such that the surfaces thereof respectively engage the opposite surfaces of the strip which extends beyond the components to form a closed conduit within which fluid can flow, means on the surface of at least one component coacting with the surface of the strip engaged therewith for defining a flow restricting flowpath within which fluid flows in contact with both surfaces, and communicating means for effecting communication between said flowpath and the other component via said strip.

2. A unit according to claim 1 wherein said coupling means is constituted by press fastening means.

3. A unit according to claim 2 wherein said components are respectively formed with coupling pins and apertures, each pin of one component adapted to engage in an aperture of the other component.

4. A unit according to claim 3 wherein one of said pins is recessed so as to permit communication via said strip.

5. A unit according to claim 1 wherein the surface of said at least one component has formed therein an elongated groove which coacts with said surface of the strip for defining said flowpath.

6. A unit according to claim 5 wherein said groove is configured with two sets of oppositely directed baffles projecting into said flowpath, the baffles of one set being respectively directed towards the inter-baffle regions of the opposite set, said baffles terminating in baffle tips, the tip of each baffle being substantially aligned with the tips of the opposite pair of adjacent baffles, an inlet and an outlet for said unit, each baffle tip being of a width $\xi$ wherein $0 < \xi < 0.25\Delta$ where $\Delta$ is the minimum throughflow spacing in the emitter.

7. A unit according to claim 1 wherein each component is constituted by a plate having a surface in which are formed hollow cells, adjacent ones of which communicate with each other via tangential channels, the surface of one plate coacting with one surface of the interposed strip and the surface of the other plate coacting with the opposite surface of the strip, and wherein the cells of one component are adapted to communicate with the cells of the other components via corresponding apertures formed in the interposed strip.

8. A drip level irrigation unit comprising:
   a. a conduit having a continuous outside surface and having a continuous inside surface of conducting liquid;
   b. a plurality of emitter drip units attached in spaced relationship to the conduit;
   c. each unit comprising a pair of casing components, each of which has a surface, the components being oriented so that the surfaces face each other, and coupling means for coupling the components together via the conduit which is interposed between the components so that the surface of one component engages the inside surface of the conduit and the surface of the other component engages the outside surface of the conduit;
   d. means on at least one of the components of a unit coacting with the surface of the strip engaged therewith for defining a flow restricting flowpath within which fluid flows in contact with the engaged surfaces; and
   e. communication means for effecting communication between the flowpath and the other component.

* * * * *